Feb. 6, 1968   H. W. APFEL   3,367,028
APPARATUS AND METHOD FOR MAKING SET-UPS OF TEETH FOR DENTURES
Filed July 27, 1964   2 Sheets-Sheet 1

INVENTOR.
HARLAND W. APFEL
BY
William C. Babcock
ATTORNEY

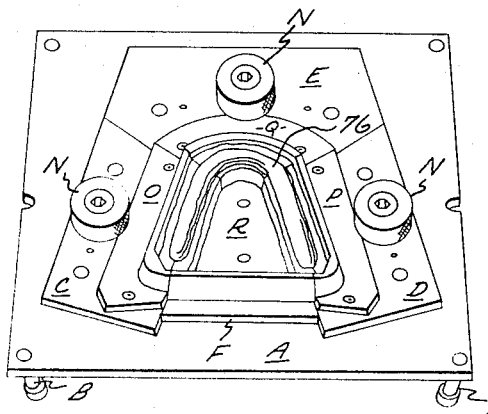
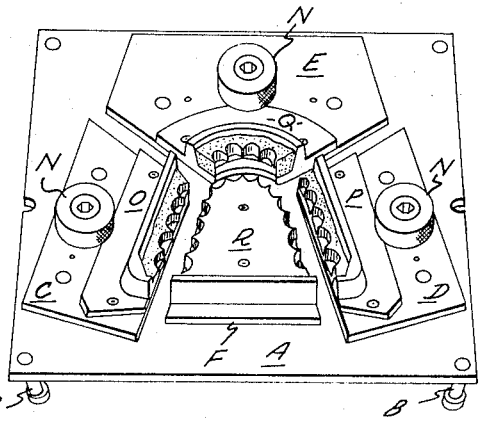
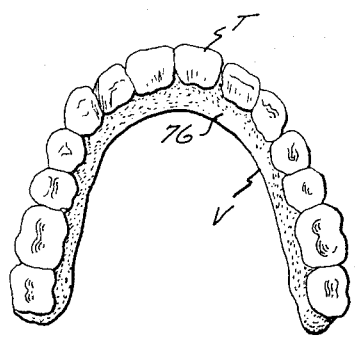
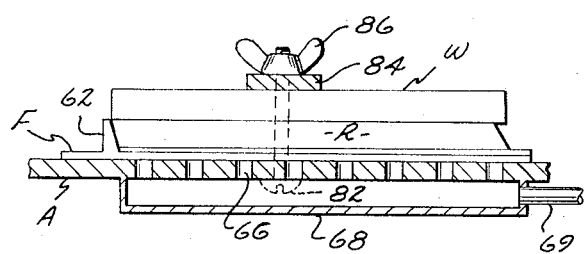
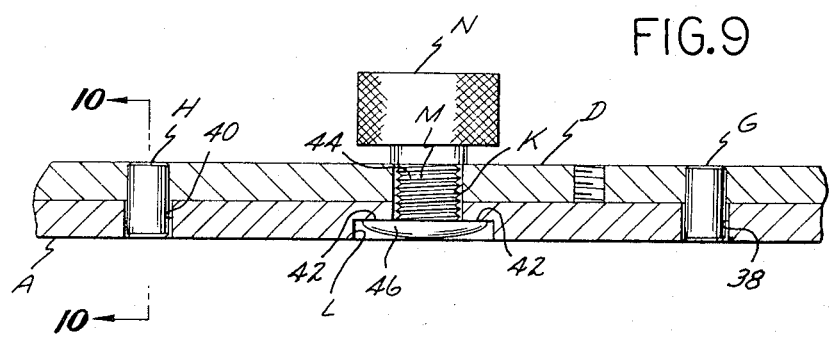
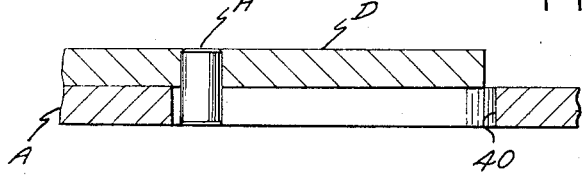

United States Patent Office 3,367,028
Patented Feb. 6, 1968

3,367,028
APPARATUS AND METHOD FOR MAKING
SET-UPS OF TEETH FOR DENTURES
Harland W. Apfel, 1622 Sunnyside Terrace,
San Pedro, Calif. 90732
Filed July 27, 1964, Ser. No. 385,320
6 Claims. (Cl. 32—11)

ABSTRACT OF THE DISCLOSURE

An apparatus and method of using same for forming set-ups of matched artificial teeth in the sequence and spacing they will occupy in a denture after a master set of replicas of said teeth has been prepared that are in said sequence and relative spacing.

An apparatus for making a set-up of teeth for artificial dentures including a stationary plate and a plurality of movable plates mounted on a flat base with a plurality of flanged bodies removably affixed to the plates to define a U-shaped space in which a matrix can be placed.

Impressions of a master set of matched artificial teeth arranged in a predetermined arcuate configuration are formed in the matrix, matched teeth are positioned in the impressions and a low melting point solidifiable material is poured over the upper surfaces of the matrix and of the teeth to form a set-up.

BACKGROUND OF THE INVENTION

Field of the invention

The present invention relates to the field of dentistry, and more particularly to an apparatus and method of using same to produce dentures in a more economical and facile manner than possible heretofore.

Description of the prior art

In the past, after dental impressions were obtained, the dentist proceeded through the following steps in the preparation of a set of dentures:

(1) Preparation of positive casts of the likenesses of the patient's gum ridges by use of impressions taken thereof.

(2) Preparation of wax or compound bite plates and bite rims to fit the positive cases.

(3) Molding or shaping of bite plates and bite rims to approximate the final outline of the expected artificial dentures, and then fitting them in the patient's oral cavity.

(4) Obtaining a desired vertical dimension between the maxillary and mandibular gum ridges by use of said bite plates and rims.

(5) Making such additional tracings or markings as may be necessary to determine the relative expected positions of the individual porcelain or acrylic teeth one with the other.

(6) Assembling and mounting of the combined casts and wax or compound bite plates and rims in an articulator.

(7) Removing sections of the wax bite rims piece-by-piece and thereafter inserting the artificial porcelain or acrylic teeth, one or two at a time, in an attempt to position the teeth in such a manner as to accomplish the harmonious and mechanical arrangement for which the artificial teeth were designed.

(8) Placing the assembled bite rims, plates and teeth in the patient's oral cavity to inspect the relationship of the teeth relative to the surrounding tissue, and one denture to the other, as well as some of the functional movements of the teeth.

(9) Returning the bite rims, plates and tooth assembly to the positive casts and by a flasking operation in the laboratory, replacing the wax or compound bite rim and plate material with a permanent denture material to produce the prosthetic dentures.

(10) Placing the dentures so constructed in the patient's oral cavity and assisting the patient with manipulation of the new prosthetic assembly.

A major object of the present invention is to supply an apparatus and method of using the same that will substantially lessen the time required in fabricating dentures, and eliminate the necessity of the dentist or laboratory technician in the performance of steps 1 to 8 inclusive listed above.

Another object of the invention is to provide a method by which any number of individual porcelain or acrylic teeth of designated mold numbers can be arranged in the sequence envisioned by the designer thereof, and held in these positions to provide a set-up for the use of a dentist or laboratory technician.

A further object of the invention is to provide an apparatus and method of using the same by means of which dentists and dental laboratories may purchase or make up matched artificial teeth in predetermined set-up arrangements.

Brief description of the drawings

FIGURE 6 is a perspective view of the closed apparatus, with a U-shaped strip of polymerizable resin overlying the impression-supported artificial teeth;

FIGURE 7 is a perspective view of the open apparatus after the set-up of artificial teeth have been removed from said impressions;

FIGURE 8 is a perspective view of a set-up of artificial teeth formed by means of the apparatus;

FIGURE 9 is a vertical cross-sectional view of the apparatus, taken on the line 9—9 of FIGURE 1;

FIGURE 10 is a vertical cross-sectional view of the apparatus, taken on the line 10—10 of FIGURE 9; and FIGURE 11 is a vertical cross-sectional view of the apparatus, taken on the line 11—11 of FIGURE 2.

Description of the preferred embodiment

Figure 1:
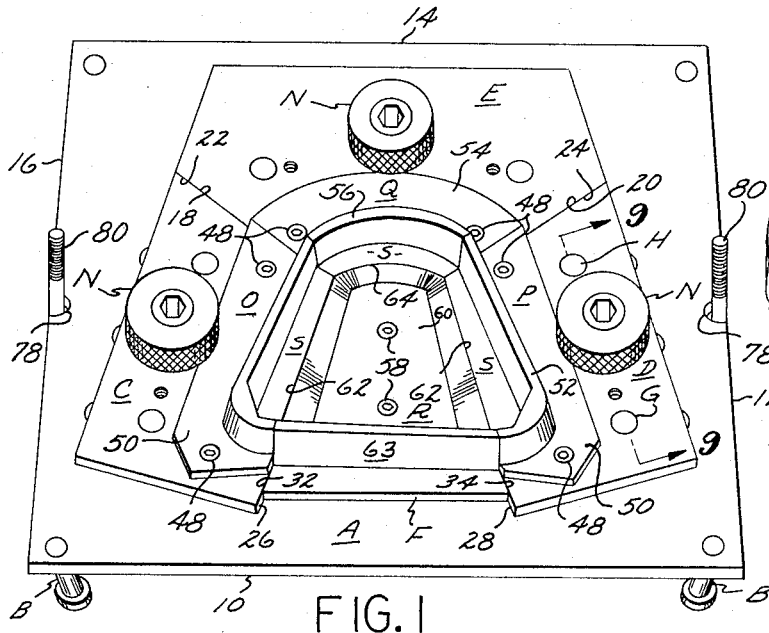
FIGURE 1 is a perspective view of the apparatus for forming a set-up of artificial teeth, which is in the closed position.

With continued reference to the drawings, and particularly to FIGURE 1 thereof, for the general arrangement of the invention, it will be seen to include a flat, generally square base A having four edges 10, 12, 14 and 16, which is maintained at an elevated position above a supporting surface (not shown) by four identical legs B.

Three plates C, D and E rest on the upper surface of base A, and are adjustably movable relative thereto. Plates C, D and E are adapted to be moved on base A to the closed position shown in FIGURE 1 where edges 18 and 20 of plates C and D respectively, are in abutting contact with edges 22 and 24 of plate E. When in the closed position shown in FIGURE 1, edges 26, 28 and 30 of plates C, D and E are in abutting contact with edges 32, 34 and 36 of a fourth plate F that is rigidly secured to the upper surface of base A.

Two spaced pins G and H project downwardly from plates C, D and E and are slidably movable in two slots 38 and 40 respectively, formed in base A. One set of pins G and H is shown in slidable engagement with slots 38 and 40 in FIGURE 9. A bore K is formed in each plate C, D and E intermediate the pins G and H, and this bore is in alignment with a slot L formed in base A. Each slot L is parallel to the slots 38 and 40 most adjacent thereto, and as can best be seen in FIGURE 10, defines two laterally spaced body shoulders 42.

The threaded shank 44 of a screw M extends upwardly through each bore K, with the head 46 of the screw being disposed in a slot L, directly below its corresponding bore K. The upper shank portion of each screw M is engaged by a nut N. When one of the nuts N is rotated in an appropriate direction, it moves downwardly on shank 44, whereby the nut and head 46 forces one of the plates C, D and E into frictional contact with base A to removably hold the plate in a fixed position thereon. Thus, when the three nuts N are tightened, the plates C, D and E can be removably locked in the closed position shown in FIGURE 1 wherein they are in abutting contact with the fourth plate F. By loosening the nuts N, the plates C, D and E can be moved to the open position on base A illustrated in FIGURE 2.

Figure 2:
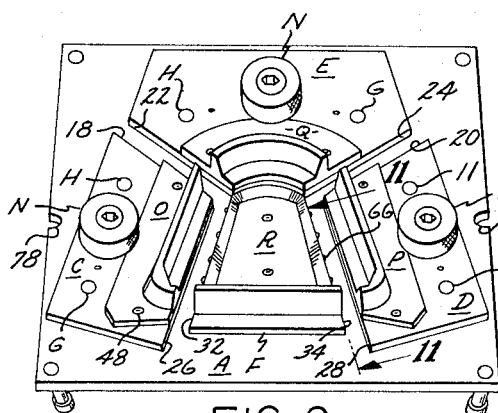
FIGURE 2 is a perspective view of the apparatus in an open position.

Four bodies O, P and Q are provided, as can best be seen in FIGURES 1 and 2, each of which is removably attachable to each plate C, D and E by screws 48 which project through each body to engage tapped bores (not shown) formed in each plate. The bodies O and P each include flat elongate portions 50 through which the screws 48 project, and flanges 52 projecting upwardly from portions 50. The major portions of flanges 52 are situated inwardly a substantial distance from the inner edges of portions 50. The portions of flanges 52 most adjacent the edge 10 of base A curve inwardly toward one another, as illustrated in FIGURES 1 and 2.

The body Q is provided with a flat portion 54 through which the screws 48 project, and has a curved flange 56 spaced outwardly from the inner edge of portion 54. The ends of flange 56 are in abutting contact with the ends of flange 52 when plates O, P and Q are in the closed position shown in FIGURE 1.

The fourth plate F (FIGURES 1 and 2) supports a fourth body R on the upper surface thereof which is removably secured to the plate F by screws 58. The fourth body R includes a central portion 60 through which the screws 58 extend, as well as a straight flange 63 that is in abutting contact with the extremities of the curved portions of the flanges 52 when the plates C and D are in the closed position. The central portion 60 is defined by two side walls 62 which taper inwardly toward one another and are connected by an arcuate end wall 64.

The interior surfaces of the flanges 52 and 56, together with the surfaces of side wall 62 and end wall 64 cooperatively define a U-shaped confined space. The base A adjacent the edges 32, 34 and 36 of fourth plate F has a series of longitudinally spaced bores 66 formed therein, as may best be seen in FIGURES 2 and 11. A shallow cup 68 is secured by welding or other means to the lower surface of the base A, and is of such size that all of the bores 66 are in communication with the interior thereof. A tube 69 extends through cup 68, and this tube communicates with the interior of the cup, as well as being connected to a suction-producing device (not shown).

Figure 3:
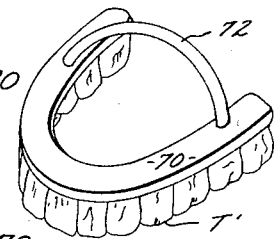
FIGURE 3 is a perspective view of a master set of artificial teeth arranged in positions for which they were designed.

Artificial teeth T used in dentures may be purchased individually in size and color by dentists from several manufacturers, and when arranged side-by-side in the arcuate configuration they are to occupy as a completed denture. After a dentist has so selected the teeth T to be used in making a denture, a master set 71 is prepared such as shown in FIGURE 3. The master set 71 includes artificial teeth T' that are replicas of the teeth T, with the teeth T' being arranged in the arcuate configuration the teeth T occupy when a part of a denture. The teeth T' are rigidly secured to the under surface of a U-shaped member 70.

A transverse handle 72 projects upwardly from the U-shaped member 70 to complete the master set 71.

Figure 4:
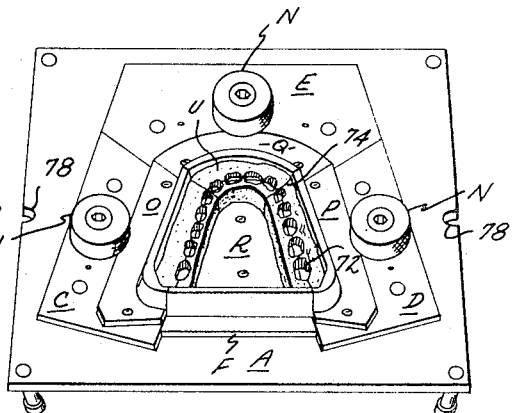
FIGURE 4 is a perspective view of the apparatus in the closed position with a matrix held therein in which impressions are formed by said master set of artificial teeth preparatory to receiving individual artificial teeth.
Figure 5:
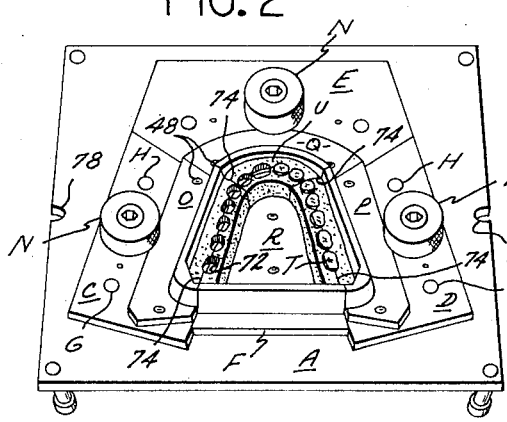
FIGURE 5 is the same view as that of FIGURE 4 showing the impressions partially filled with individual teeth.

The plates C, D and E of the apparatus are moved to the closed position shown in FIGURE 1, and the nuts N rotated to lock the plates in a fixed position on base A. The U-shaped space S is then filled with a polymerizable resin U (FIGURE 4) and the teeth T' of the master set 71 pressed downwardly into the polymerizable material to form a sequence of impressions 72 therein. Each of the impressions 72 is adapted to snugly receive one of the porcelain or acrylic teeth T, as may best be seen in FIGURE 5. Prior to the insertion of the teeth T into impressions 72, parting lines 74 are formed in the polymerizable material U to permit the plates C, D and E to be moved from the closed position shown in FIGURE 5 to the open position illustrated in FIGURE 7.

After the teeth T have been inserted in the impressions 72, the tube 69 (FIGURE 11) is utilized to form a vacuum in cup 68 to draw the teeth downwardly into full seating engagement with the interior surfaces of the impressions. Thereafter, a low melting point flowable compound such as wax or the like, is placed in that portion of space S existing above the material U to define a body 76. When the U-shaped body 76 solidifies, it adheres to the gingwal portions of the teeth T, and when the plates C, D and E are moved to the open position shown in FIGURE 7, the material U separates from the teeth T whereby it is possible to remove the teeth and body as a unit comprising a set-up V from the apparatus.

The assembly of teeth T and the U-shaped body 76 as shown in FIGURE 8, actually provide one-half of a set-up for a dentist. The other half of the set-up is removably connected to the first half shown in FIGURE 8 by temporary connections such as pins, wires, or the like (not shown). Sets of bodies O, P, D and R (not shown) in different dimensions are provided which may be removably affixed to the plates C, D, E and F whereby set-ups V may be made up in different sizes. Set-ups V in a variety of sizes are required to conform to the variations in gum ridges of different patients.

The use and operation of the invention are relatively simple. Impressions of the maxillary and mandibular ridges in the oral cavity of a patient are taken, from which wax bite plates and bite rims are prepared to approximately the final outline form of the expected artificial dentures.

The wax bite rims and plates (not shown), with the teeth set-ups (FIGURE 8) in the desired positions relative thereto are subjected to a conventional flasking operation in the laboratory to replace the wax or lower melting point compound in the bite plates and rims, as well as that which defines the body 76, with a permanent denture material. This flasking operation produces the final dentures, with the teeth T included as a part thereof, in the same spacing and configuration they occupied when connected by body 76. The denture or dentures so constructed are placed in the patient's oral cavity and final adjustments made thereto as to fit.

Should it be desired to subject the body 76 to pressure during the time it is setting up, a pressure pad W is provided, such as that shown in FIGURE 11, that contacts the upper surface of the body. Two oppositely disposed slots 78 are formed in the sides 12 and 16 of base A, and two inverted screws 80 are inserted in these slots, with the heads 82 of the screws positioned in abutting contact with the under surface of the base.

A cross bar 84 is employed that has bores formed in the end portions thereof through which the screws 80 project upwardly. The upper ends of screws 80 are engaged by thumb nuts 86. By rotating nuts 86 in a direction to move them downwardly on screws 80, the cross bar 84 is moved downwardly to exert a downward force on pad W and body 76.

Although but one master set of artificial teeth is shown in FIGURE 3 of the patent drawings, two matched master sets must, of course, be provided for use in the preparation of a full set of dentures, with one master set of artificial teeth being a replica of the teeth T that will be in the completed upper denture and the other master set of atrificial teeth a replica of the teeth that will be in the completed lower denture. The teeth T' in the two master sets are matched, and thus any possibility that the teeth T in the finished dentures will not come into occluding contact in use will not occur.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:

1. A device for forming a set-up of matched artificial teeth in the arcuate configuration they are to occupy in a denture, including:
   (a) a base having a flat upper surface;
   (b) a stationary plate mounted on the upper surface of said base;
   (c) a plurality of plates movably mounted on the upper surface of said base and partially surrounding said stationary plate;
   (d) a plurality of flanged bodies removably affixed to said movable plates;
   (e) a body removably mounted on the upper surface of said stationary plate, with said bodies on said movable plates and stationary plate defining a generally U-shaped space that can contain a matrix which solidifies after impressions of artificial teeth in an arcuate configuration are formed therein when replicas of a master set are pressed therein, with parting lines being formed in said matrix to permit movement of said movable plates relative to said stationary plate;
   (f) means for removably locking said movable plates in a closed position relative to said stationary plate to define said U-shaped space, with said artificial teeth being adapted to be disposed in said impressions when said plates are in said closed positions; and adapted to have a quantity of solidifiable, low melting point material poured in liquid form into said U-shaped space to overlie the upper surfaces of said artificial teeth and said matrix, which teeth and material cooperatively provide said set-up when said material solidifies, with said set-up being removable from said device when said movable plates are moved to spaced positions apart from said stationary plate.

2. An apparatus as defined in claim 1 which further includes:
   (f) means to apply pressure on said low melting point material when it overlies said teeth to force said material into intimate contact with said teeth.

3. An apparatus as defined in claim 1 which further includes:
   (g) means for applying a negative pressure to said impressions below said teeth therein to fully seat said teeth in said impressions.

4. An apparatus as defined in claim 1 which further includes:
   (h) a plurality of pins that project downwardly from said movable plates into elongate slots formed in said base to limit the direction and the extent of movement of each of said movable plates relative to said stationary plate.

5. An apparatus as defined in claim 1 wherein said means for removably locking said movable plates comprise:
   (a) a plurality of screws, each of which has a head slidably mounted in a shouldered slot formed in said base, and each of which screws extend upwardly through an opening formed in one of said movable plates; and
   (b) a plurality of nuts that engage portions of said screws which extend above said movable plates, with each of said nuts when tightened on one of said screws drawing said base and the plate with which said nut is associated into pressure contact to the extent that said plate is held in a fixed position relative to said base.

6. A method of forming a set-up for one-half of a set of dentures, comprising:
   (a) obtaining a set of artificial matched teeth that are designed to be disposed in a predetermined sequence in an arcuate configuration and in side-by-side relationship;
   (b) making a master set of replicas of said matched teeth in said arcuate configuration;
   (c) preparing a U-shaped body of a solidifiable matrix;
   (d) forcing said replica teeth of said master set into said matrix to make a plurality of impressions thereof therein, and allowing said matrix to solidify;
   (e) severing said matrix into a plurality of sections that can be separated from one another;
   (f) holding said sections in abutting contact;
   (g) placing said matched teeth in said impressions;
   (h) pouring a body of low melting point solidifiable material in liquid form over the upper surface of said matrix and the upper surfaces of said teeth held in said impressions therein, which liquid material is contained in a U-shaped space of desired width;
   (i) allowing said low melting point material to solidify and grip said teeth;
   (j) separating said sections of matrix; and
   (k) removing said teeth and said solidified body of low melting point material from said separated sections as an integral unit that comprises said set-up.

References Cited

UNITED STATES PATENTS 1,692,928  11/1928  Clapp et al. _____ 32—11
2,618,063  11/1952  Fournet _____ 32—11

FOREIGN PATENTS 828,164  2/1938  France.

LOUIS G. MANCENE, *Primary Examiner.*

ROBERT E. MORGAN, *Examiner.*